Nov. 6, 1928.  1,690,222
C. W. FOERTSCH
VALVE GEAR FOR INTERNAL COMBUSTION ENGINES
Filed May 3, 1922  3 Sheets-Sheet 2
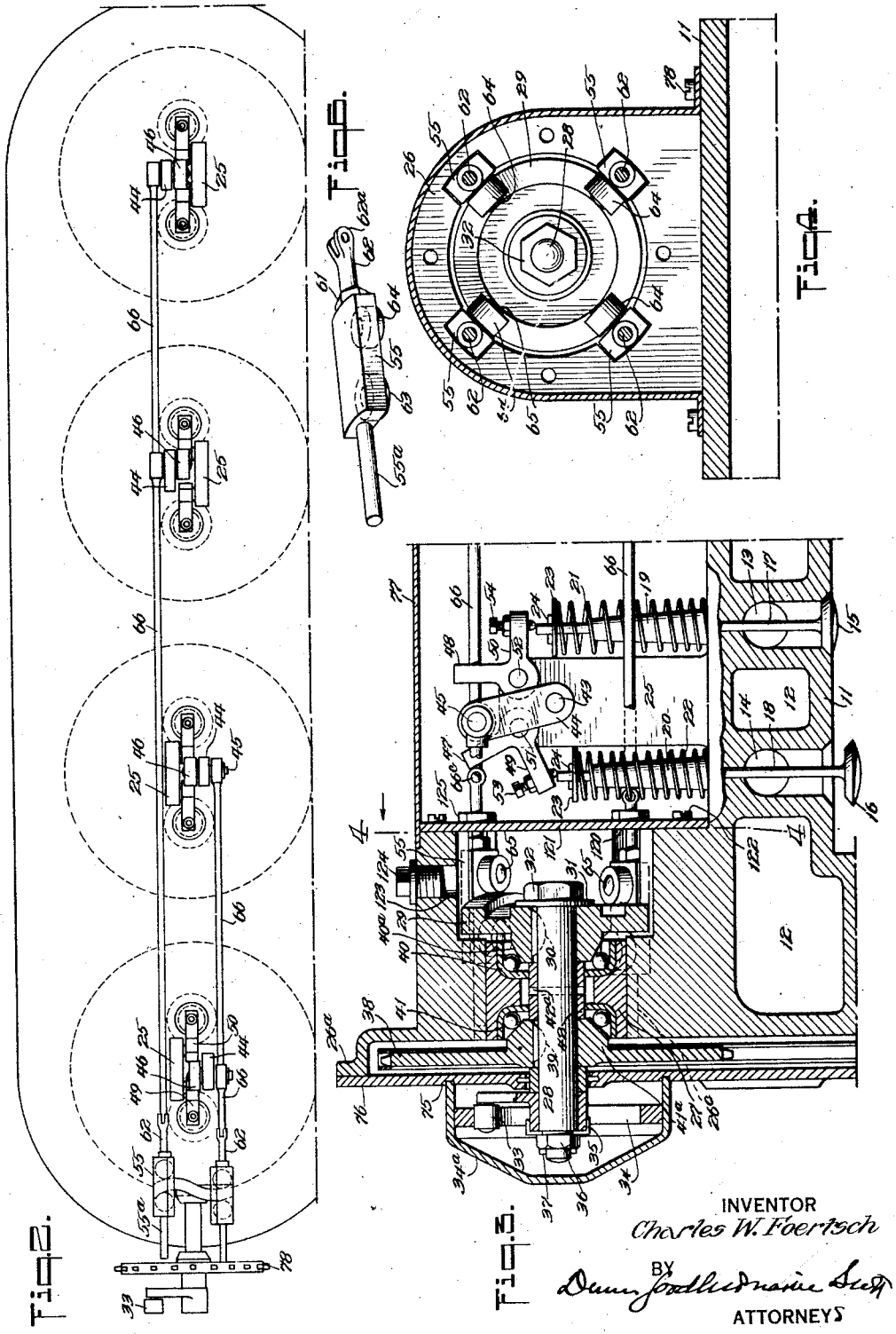
INVENTOR
Charles W. Foertsch
BY
ATTORNEYS

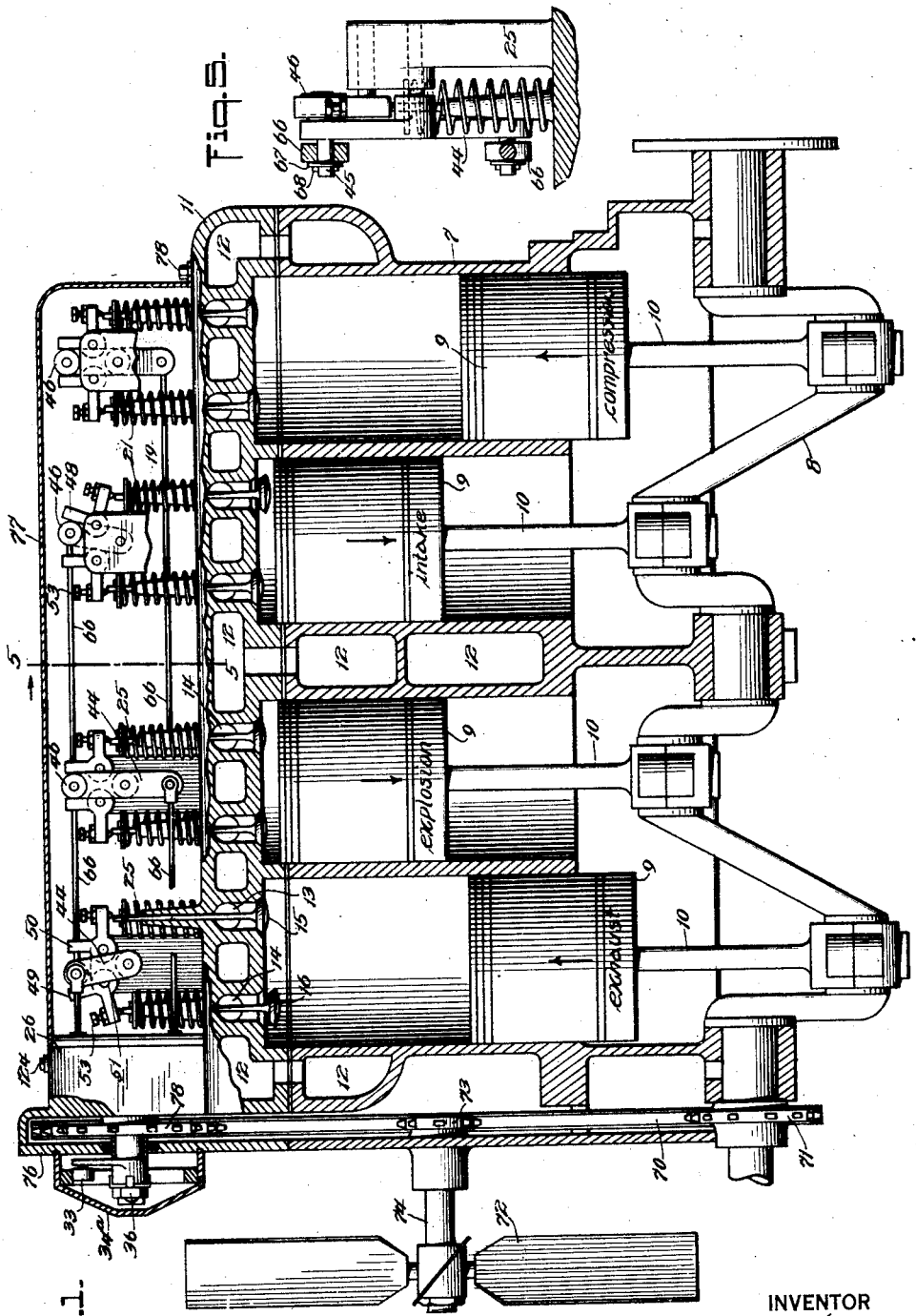

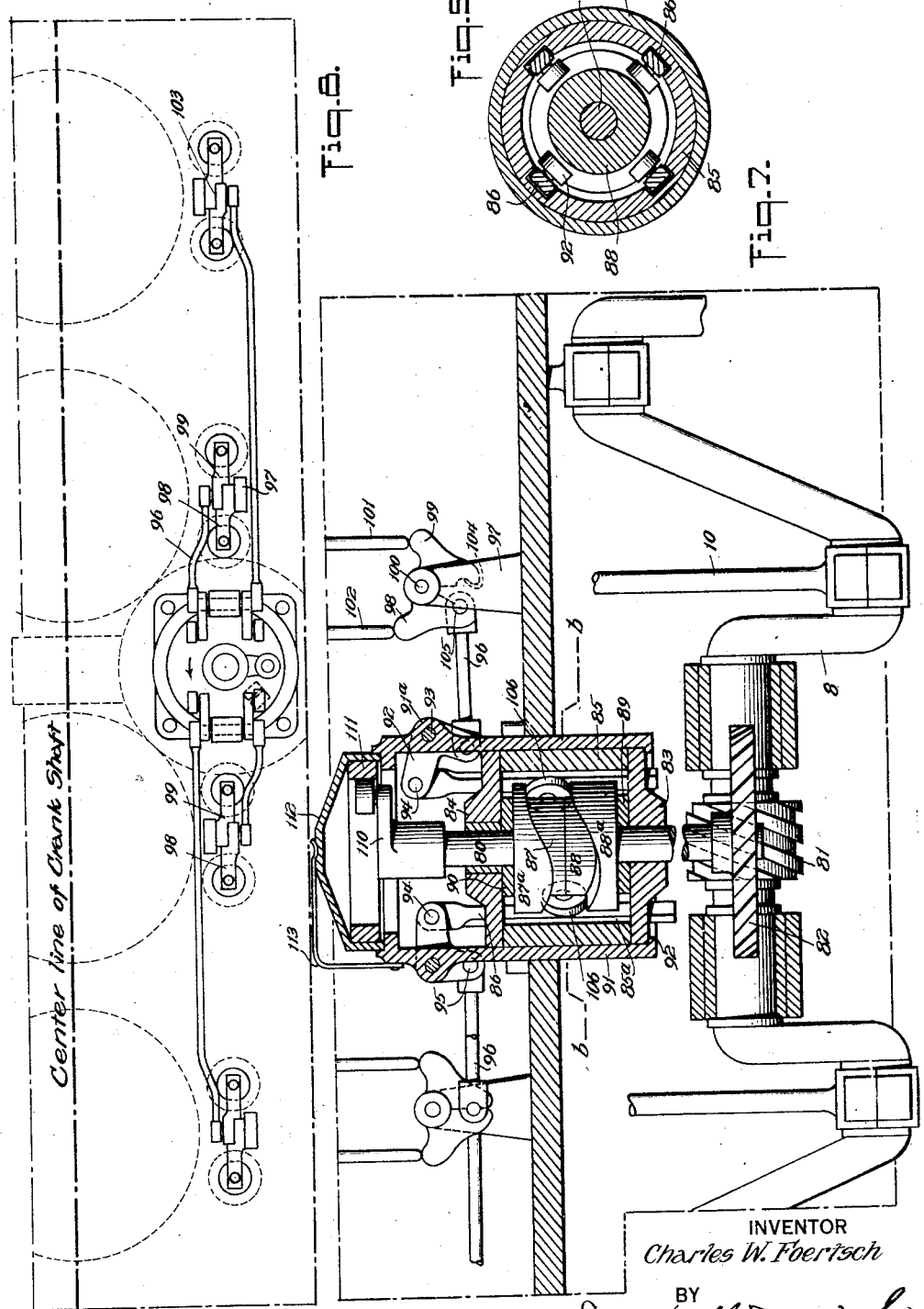

Patented Nov. 6, 1928.

1,690,222

UNITED STATES PATENT OFFICE.

CHARLES W. FOERTSCH, OF BROOKLYN, NEW YORK, ASSIGNOR OF ONE-HALF TO CLARENCE P. BROWNING, OF NEW YORK, N. Y.

VALVE GEAR FOR INTERNAL-COMBUSTION ENGINES.

Application filed May 3, 1922. Serial No. 558,249.

The present invention relates to improvements in internal combustion engines, and is more especially directed to mechanism for actuating the intake and exhaust valves in such engines.

It is well known that in internal combustion engines, such as employed in motor vehicle construction, there are three general types which are known as the T-head motor, L-head motor and I-head motor. In all of these types of engines, the valves are actuated by means of cams mounted on cam shafts having bearings in the crank cases of the motors, the number of cams employed varying according to the type of the motor. For instance, in the T-head type of motor, the exhaust valves are on one side of the engine, while the intake valves are on the opposite side thereof. Consequently, two cam shafts are used in this construction, one for each set of valves. In other types of motors, one cam shaft is employed which carries cams corresponding in number to the valves to be actuated thereby. In all existing types of engines of the class described, the cams used for actuating the valve increase with the multiplication of engine cylinders, and each increase obviously entails additional expense in the construction of the motor and likewise adds to the number of parts which require attention in adjustment and replacement from time to time to obtain the highest efficiency of engine performance.

In practice, the present engine structures, referring specifically to the valve gear or valve actuating mechanism, require frequent adjustment of the valves to obtain accurate timing to compensate for the wear of the cams, and, in those instances where the wear has been excessive, the cam shafts must be removed and new shafts substituted therefor. This replacement is not only a laborious task, but requires highly skilled mechanics or engineers who are familiar with the principles of operation of the valve gear or valve actuating mechanism and the method of timing or synchronizing the functioning of the valve with the piston travel.

Another objection to the incorporation of the cam shafts in the crank cases of the motors is the increase in bulk or size and weight of the motor as a whole, and also in the provision of means for properly lubricating the cam shafts and the cams, so that they will function with a minimum of wear.

In some forms of motors, such as employed in aircraft and hydroplane construction, the cam shafts are overhead, that is to say, they are carried on the top of the engine head; but, in such structures, the prevailing practice of engine construction is resorted to, and a cam is provided for each valve. The overhead cam shaft structure is open to the same objections as to wear and adjustment as that which is embodied in the more generally used crank case mounting.

One of the important objects of the present invention is to reduce the cost of construction of internal combustion engines by eliminating the cam shaft of the present type, and provide for the actuation of all of the intake and exhaust valves by a single cam.

Another object of my invention is to obviate the necessity for frequent adjustments of the valve actuating mechanism, and minimize the wear so as to produce a more quietly functioning valve gear than is at present obtainable, and at the same time permit of the making of adjustments when necessary in an expeditious and economical manner.

My invention also contemplates a valve gear or valve actuating mechanism for internal combustion engines which may readily be embodied in engines having valve actuating mechanism of the types now generally in use, or which may be incorporated in new engine structures without materially changing their design.

In carrying my invention into practice, I have also simplified the methods of driving the cam by means of which the valves are actuated, and I employ such driving means for operating the distributor or timer through the medium of which an electric spark is generated in the respective cylinders to ignite the combustible mixture therein and produce the power stroke of the piston.

As the description of my invention proceeds, it will be noted that I have devised a compact and positively operating valve mechanism which permits of a wider range of valve adjustment so that the timing of the valves may be more accurately carried out than is possible in present types of valve actuating mechanisms, thus improving the "pick-up" or acceleration of the motor and permitting it to produce a higher torque under maximum load than can be obtained in engines embodying the present types of valve structures.

Other advantages and objects of my invention will present themselves as I proceed with the description, and I would have it understood that I reserve to myself all rights to the full range of equivalents both in structure and uses to which I may be entitled under my invention in its broadest aspect.

For the purposes of the present disclosure, I have elected to illustrate and describe certain preferred embodiments of my invention as applied to a four-cycle four-cylinder internal combustion engine of the type employed in motor vehicle construction. Obviously, my invention is applicable to an engine having a greater or lesser number of cylinders, and is also susceptible of incorporation in engines of the so-called V-type.

In the accompanying drawings, Figure 1 is a longitudinal section in elevation of a four-cycle four-cylinder internal combustion engine embodying my improved valve gear or valve actuating mechanism;

Fig. 2 is a diagrammatic top plan view of the valve actuating mechanism shown in Fig. 1;

Fig. 3 is an enlarged sectional detail of a portion of the structure shown in Fig. 1, illustrating the cooperative relation of the cam and valve rods;

Fig. 4 is a front elevation of the cam and valve rod guides taken on the line 4—4 of Fig. 3;

Fig. 5 is a sectional elevation of the rocker arm mounting and cooperating parts for one pair of valves viewed from the line 5—5 of Fig. 1;

Fig. 6 is a detail view of the cam follower carriage shown in Figs. 2 to 4 inclusive;

Fig. 7 is a sectional elevation of a modified form of my invention such as may be employed in the construction of motors in which the valves are not of the overhead type;

Fig. 8 is a diagrammatic view of the layout of the valve actuating mechanism shown in Fig. 6; and Fig. 9 is a detail of the cam shown in Figs. 6 and 7.

Referring now to the drawings in detail, in which like characters of reference are employed to designate similar parts throughout the several views, and more specifically to the structure illustrated in Figs. 1 to 6, inclusive, 7 indicates the cylinder block of a four-cycle four-cylinder engine and 8 the crank shaft to which the pistons 9 are connected by the usual connecting rods 10. The block 7 has removably secured thereto a head 11 which is water-jacketed at 12 and contains the conventional inlet and exhaust ports 13 and 14 respectively, communicating with the valve openings in the combustion chambers of the respective cylinder.

The valves shown are of the usual poppet type which are adapted to cooperate with the valve seats provided in the valve openings to close or seal the combustion chamber in the customary manner.

In order to facilitate the description of the construction and operation of my invention, I shall describe the layout of the valve mounting and actuating means with particular reference to the first cylinder of the engine, as shown in Fig. 3, it being understood, of course, that the description of the structure with reference to the first cylinder applies to the remaining cylinders of the engine except as to the timing or sequence of operation of the valves.

The inlet valve is indicated at 15 and the exhaust valve at 16. These valves are provided with the usual stems 17 and 18 which are adapted to reciprocate within the valve guides 19 and 20, respectively. The guides may be cast integral with the head 11, or they may be removably mounted thereon in any suitable manner to facilitate replacement when worn. The usual expansion coil springs 21 and 22 are supported on the valve guides 19 and 20, one end of each spring bearing on the base of the guide, while the other end abuts against a washer 23 which is interposed between the spring and a retaining pin 24 carried by the stem of the valve. It is obvious, by this arrangement, that the tendency of the springs to expand will insure seating of the valves.

Preferably offset from the longitudinal line of location of the valve guides 19 and 20 on the head 11, and parallel thereto, I provide a bracket 25 centered on a line transverse of said head and equidistant from each of said valve guides 19 and 20. This bracket, similarly to the guides 19 and 20, may be cast integral with the head or detachably mounted thereon.

At the front end of the engine, preferably cast integral with the head 11, I provide a housing 26 apertured to receive a bushing 27 which forms a bearing or mounting for a shaft 28. Keyed at 30 to the inner end of said shaft is a cam 29 having a preferably integrally formed cone $40^a$ adapted to cooperate with the ball-bearing 40, the cam being held against longitudinal movement of the shaft by a lock-washer 31 and a nut 32. On the outer end of the shaft 28, I mount the usual traveling contact 33 of the timer 34, the hub of the contact arm being positively connected to said shaft by means of a lock-washer 35 and a nut 36, the latter of which is held against rotation by a pin 37. Inwardly of the timer, I locate a sprocket 38 which is keyed to said shaft, as shown at 39, whereby the shaft may be driven by means of a chain or the like, as hereinafter described. This sprocket 38, similarly to the cam 29, has a preferably integrally formed cone $41^a$ adapted to cooperate with the ball-bearing 41.

It will be observed that the ends of the bushing 27 are enlarged to receive the said ball or thrust-bearings 40 and 41, the inner peripheries of the races or cups of which surround the collar 42 which is pinned to the shaft at 42ª and forms a stop or spacer to limit the adjustment of the bearings with respect to the cones 40ª and 41ª of the cam 29 and the sprocket 38, respectively.

Pivotally mounted at 43 on the bracket 25 is a lever 44 provided with a pin 45 adjacent to its upper end, on one end of which is mounted a roller 46. This roller 46 is adapted to contact with the members 47 and 48 of the rocker arms 49 and 50 which are pivoted to the bracket 25, as shown at 51 and 52, said rocker arms having adjustment screws 53 and 54 located at the outer ends of their normally horizontal portions.

Mounted for reciprocatory movement within the housing 26 is a member 55 forming a carriage for the cam followers 63 and 64, which rotate on the pins 65 and are alternately engaged by the active and inactive cam surfaces on the opposite faces of the cam 29 as the latter revolves with the shaft 28. These members 55 correspond in number to the cylinders of the engine, one to each pair of valves. In the present showing of a four cylinder motor, the cam follower carriages are four in number and are preferably located, as shown in Figure 4, diametrically opposite of the cam and spaced 90° apart. One end of each member or carriage 55 is provided with a reduced extension 55ª which is adapted to reciprocate in the guideway 26ᶜ, shown in dotted line in the front face of the housing 26, the opposite end of said member or carriage 55 being preferably formed with an internally threaded opening to receive the link 62 formed with a clevis 62ª at its outer end, said link being held in adjusted position in the carriage or member 55 by means of a lock-nut 61.

The link 62 has a bearing within an aperture 120 in the cover plate 121 secured to the housing 26 by means of screws or bolts 122 and in cooperation with said extension or projection 55ª of the member or carriage 55 serves to maintain the cam follower carriage in its proper relation to the periphery of the cam and guide the same in its reciprocatory movement so as to insure positive contact between the active cam surfaces and the peripheries of the cam followers.

Connected at one end to the clevis 62ª of the link 62, by means of a pin 66ᶜ, is a valve rod 66. The other end of this valve rod 66 is preferably enlarged and suitably apertured for mounting on the pin 45 which carries the roller 46, the rod end being held against movement longitudinally of said pin by means of the usual cooperating washers and cotter-pins 67 and 68.

In Figs. 1 and 3, it will be observed that the piston in the first cylinder is on its exhaust stroke, while that in the third is on the intake stroke. Consequently, the exhaust valve in the first cylinder and the intake valve in the third cylinder are open. The opening of the exhaust valve in the first cylinder is effected by the reciprocatory movement of the valve rod for the first cylinder toward the front of the engine, this being brought about by the roller cam follower to which such rod is connected coming in contact with the active surface on the front face of the cam. The resultant movement of this valve rod rocks the lever 44 on its pivot 43, and causes the roller 46 to bear against the member 47 of the rocker arm 49 and rock said arm on its fulcrum 51, thereby depressing the valve stem 18 by the engagement of the adjustment screw 53 with the upper end thereof. Simultaneously, the valve rod 66 leading to the third cylinder of the engine is reciprocated or moved in the opposite direction by one of the roller cam followers 63 connected thereto becoming engaged by the active surface of the rear face of the cam 29. The rocker arm for the intake valve of the third cylinder in thus oscillated on its fulcrum through the movement of the arm 44 on its pivot 43 to bring the roller 46 into engagement with the upright portion of said arm.

In carrying my invention into effect, it will be noted that I employ four valve rods 66, one for each cylinder, which must necessarily be of different lengths. If desired, the longer rods,—those leading to cylinders 3 and 4, for instance,—may be supported between their valve and cam ends by any suitable means, such as a bracket or the like, within which they may have free longitudinal movement.

In the present showing, the sprocket 38 is driven by a chain 70 traveling on the sprocket 71 keyed to the crank shaft 8. This chain 70 may also drive the fan 72 by traversing the sprocket 73 carried by the inner end of the fan shaft 74. It will be seen that, by this means, the fan, timer and cam are driven by a single chain which materially reduces the cost of construction; facilitates adjustment for wear, and insures positive synchronism of the valve actuating mechanism and the ignition unit.

The timer or commutator 34 is housed within the slip cover 34ª which is spring seated within the recess 75 in the front cover plate 76 of the housing within which the driving chain 70 travels, said plate cooperating with the forwardly projecting flange 26ª provided on the housing 26. The valve gear, beyond the housing 26, is protected by a cover plate 77 which fits upon the housing 26 at its front end and is adapted to be bolted or otherwise fastened to the engine head as shown at 78. By housing the valve gear in this manner, it is protected against the accumulation of grit or dirt, and any noise which may result from the functioning of the valve gear is effectively silenced. To lubricate the valve gear, the cover plate 77 may be removed and a suitable lubricating medium applied to the rocker arms and their cooperating parts in the usual manner. The cam and other parts of the valve actuating mechanism contained within the housing 26 may be lubricated by any suitable medium injected through the opening 123 in the top of the housing 26 which is closed by the screw plug 124. To prevent the passage of the lubricant contained within the housing 26 through the apertures within which the links 62 reciprocate, I have found it expedient to provide the usual felt retaining washers 125, although any other suitable packing may be used.

In Figs. 7 to 9, inclusive, I have illustrated a modified embodiment of my invention as employed in connection with a motor of the L-head or T-head type, in which the valve stems lie in a plane parallel to the sides of the cylinder block. In this layout, the cam shaft 80 is disposed in a vertical plane, and is driven from the crank shaft 8 by the worm 81 keyed to the crank shaft and meshing with the helical gear 82 keyed to the lower end of said cam shaft 80. The cam shaft 80 has bearings in the base 83 and head 84 of the cam cage 85.

It will be noted that the wall of the said cage is formed with elongated slots or apertures to provide bearings and guides for the levers 86, these levers extending through the base and head of the cam cage, for which purpose apertures are provided in said base and head in alignment with the slots 85$^a$ in the wall of said cage. The cam is of the cylindrical type and is preferably formed of two parts indicated at 87 and 88, these members being held in assembled relation on the cam shaft 80, and within the cage, by means of the spacer 89 and the bushing 90, within which the cam shaft 80 is journaled. The cam cage 85 is removably supported within a housing 91, which has an inturned flange 92 at its base to form a support for the base of the cam cage 83.

In proximity to the upper end of said housing 91, I form ears or abutments 91$^a$ which are arranged in pairs to form mountings for the bell crank levers 92, these levers being fulcrumed at 93. The inner ends of the bell crank levers 92 (those normally within the cage) are pivotally connected at 94 to the upper ends of the levers 86, while the outer extremities of said levers have a pivotal connection 95 with the valve rods 96. Positioned upon the flange for supporting the crank case are brackets 97 which may be cast integral therewith or detachably secured thereto in any suitable manner, upon which the rocker arms 98 and 99 are fulcrumed.

The rocker arms 98 and 99, which may be of the configuration shown, are mounted on a pin 100 projecting laterally from the upper end of the bracket 97. In order to obtain proper alignment of the rocker arms 98 and 99 with relation to each other and to the valve stems 101 and 102, I have found it expedient to undercut the cooperating bearing surfaces of said arms, as shown at 103 in Fig. 8, so as to form an interlocking joint. This construction materially increases the bearing surface of the arms on the pin 100 and consequently adds to the durability of the structure.

Similarly to the structure shown in Figs. 1 to 6, inclusive, one valve rod serves to actuate both rocker arms of each pair. This is accomplished by the formation of a semi-annular recess 104 in the abutting surfaces of the dependent portions of each pair of arms which, when the arms are at rest, register to form an annular opening for the reception of the pin 105 carried by the socket end 96$^a$ of the valve rod 96.

It will be noted that the cam formed by the members 87 and 88 is provided with projecting flanges at the upper and lower ends thereof, the opposite faces of which are formed with the active and inactive surfaces, by means of which the respective valves are opened at the proper time. The actuation of the valves is effected by the reciprocation of the levers 86 as the cam revolves and the cam followers 106 ride upon the cam surfaces. The movement of the levers 86 rock the bell crank levers 92 on their fulcrum points 93 whereby the rods 96 are reciprocated. Viewing the right hand of Fig. 7, it will be observed that the rocker arm 98 is in the position of raising or lifting the valve stem 102. This is accomplished by the upward movement of the lever 86 as the roller connected to said lever is brought into contact with the active portion of the cam formed on the lower flange 88$^a$. This upward movement of the lever 86, through the medium of the bell crank connection, exerts a pull upon the valve rod 96, and the pin 105 carried by the socket 96$^a$ of said rod, being in engagement with the semi-annular recess 104 in the rocker arm 98, rocks the latter on its pivot and effects the lifting of the valve stem 102 which is normally held in contact therewith by the usual valve springs not shown. As the cam continues to rotate, it will be manifest that the same cam follower roller will be engaged by the active cam surface on the flange 87$^a$, whereby the lever 86 will be moved downwardly so that the valve rod 96, which, following the return of the valve to its normal position of rest, will oscillate the rocker arm 99 through the engagement of the pin 105 with the semi-annular recess 104 in said rocker arm. The same sequence of operation of the valve rods is carried out for the actuation of the valves for each cylinder. In other words, one valve of each pair is actuated by the movement of the valve rod toward the front of the engine, while the other valve is lifted by the movement of the same valve rod in the opposite direction.

It will be noted that the valve rods for the first and fourth cylinders are of greater length than those for the second and third, and, owing to the fact that the actuating cam is located between the second and third cylinders, I have found it good practice to locate all of the valve rods in the same horizontal plane, the socket ends thereof, which are connected to the rocker arms, being offset from the respective body portions of the rods so as to carry out this method of location. In the structure illustrated in Figs. 1 to 6, inclusive, however, it will be seen that the valve rods for the first and third cylinders and those for the second and fourth cylinders are in different horizontal planes, owing to the formation of the cam and the position in which it functions. Consequently, the levers 44 which are pivoted to the brackets 25 on the second and fourth cylinders are of substantially greater length than the levers which are pivoted to the brackets of the first and third cylinders. The lengthening of the levers 44 for the second and fourth cylinders is rendered necessary in order to afford a means of connecting the valve rods 66 thereto, the method of connection being similar to that described with reference to the specific structure of Fig. 3.

Referring again to Fig. 7, the movable or rotating contact 110 of the commutator or timer 111 is keyed or fixed to the cam shaft 80 so that the actuation of the valves and the functioning of the commutator or timer may be synchronized to occur at the proper intervals during the operation of the engine. The timer or commutator 111 is protected by a cover-plate 112 mounted in the recessed portion at the top of the housing 91 and is held in position by the usual spring clip 113.

In the structure shown in Fig. 1, the firing order of the cylinders is 1, 2, 4, 3, and, as the cam travels at one-half the crank shaft speed, it will be obvious that in practicing my invention, as shown in Figs. 1 to 6, inclusive, or, as illustrated in the remaining figures, I will require a cam layout which will actuate the inlet and exhaust valves in their proper sequence during the operation of the engine. The layout of the cam surfaces may be obtained by any of the formulas conforming to the established practice of the automotive engineering industry.

While I have described my invention with reference to a four-cylinder engine or motor, it is obvious that my valve gear or valve actuating mechanism will perform with equal efficiency on engines having a greater or lesser number of cylinders. In V-type motors, for instance, the cam may be mounted between the blocks, the construction and arrangement of the cooperating parts being similar to that shown in Fig. 7, or, if preferred, an overhead valve gear layout of the type shown in Fig. 1 may be employed. It is manifest that such changes in mechanical detail as may be necessary to permit of the use of my invention in the aforesaid ways come within the spirit and scope of my invention which is broadly directed to a valve gear or valve actuating mechanism in which all of the valves are actuated by a single cam.

Having described my invention, what I claim as new and desire to secure by Letters Patent, is:

1. A multi-cylinder internal combustion engine having separate inlet and exhaust valves in each cylinder, an element for positively and separately controlling the opening of the inlet and exhaust valves of each of said cylinders and a cam having its operating face substantially in a plane perpendicular to the axis of rotation of the engine crank shaft for timing the functioning of all of said elements.

2. A multi-cylinder internal combustion engine having separate inlet and exhaust valves in each cylinder, a cam having its operating face substantially in a plane perpendicular to the axis of rotation of the engine crank shaft and means for actuating all of said valves from said cam, said means including a plurality of reciprocating elements, each of which is connected to separately control the actuation of the inlet and exhaust valves of a predetermined one of said cylinders.

3. In a valve gear for multi-cylinder internal combustion engines, the combination of yieldable means for seating the inlet and exhaust valves of a plurality of said cylinders, means for positively opening said valves, and a cam having its operating face disposed substantially in a plane perpendicular to the axis of rotation of the engine crank shaft for controlling the functioning of said valve opening means in their proper sequence.

4. In a multi-cylinder internal combustion engine having inlet and exhaust valves in each cylinder, the combination of means for actuating all of said valves including a cam, having its operating face disposed substantially in a plane perpendicular to the axis of rotation of the engine crank shaft, said means also including a plurality of rotatable and reciprocating elements cooperatively associated with said cam, each of the reciprocating elements dually functioning to control the opening of the inlet and exhaust valves of a predetermined one of said cylinders.

5. In a multi-cylinder internal combustion engine having inlet and exhaust valves in each cylinder, the combination of a cam, having its operating face disposed substantially in a plane perpendicular to the axis of rotation of the engine crank shaft, a plurality of rocker arms cooperatively associated with the stems of said valves, reciprocating elements adapted to be actuated by the rotation of said cam and means carried by said elements to engage said rocker arms to open the inlet and exhaust valves of a predetermined one of said cylinders in synchronism with the intake and exhaust cycles of the engine.

6. A multi-cylinder internal combustion engine embodying an overhead valve gear including a cam, having its operating face disposed substantially in a plane perpendicular to the axis of rotation of the engine crank shaft, a commutator mounted to operate in synchronism with said cam, means for driving said cam and said commutator from the crank shaft of the engine, a rocker arm for each valve of each cylinder, and means for operating each of said rocker arms from said cam to control the opening of the inlet and exhaust valves of a predetermined one of said cylinders in synchronism with the intake and exhaust cycles of the engine.

7. In a multi-cylinder internal combustion engine, the combination of a detachable cylinder head having inlet and exhaust ports for each cylinder formed therein, valves for closing said ports, means associated with the stems of said valves for guiding movement thereof, a bracket located intermediate of the inlet and exhaust valves of each cylinder, a pair of rocker arms pivoted to said bracket, a cam, cam followers associated therewith, a lever connected to said bracket and means of connection between said cam followers and said levers adapted to oscillate said lever on its fulcrum as the active and inactive surfaces of the cam engage the cam followers, and means carried by said lever for engagement with said rocker arms to function the same to open the valves of each cylinder in synchronism with the intake and exhaust strokes of the engine pistons.

8. An overhead valve gear for multi-cylinder internal combustion engines, comprising a bracket located intermediate of the inlet and exhaust valves of each cylinder, a pair of rocker arms pivoted to said bracket, and carrying means adapted to engage the respective stems of said valves, a cam mounted to rotate on an axis parallel to the cylinder head of the engine, means for driving said cam from the crank shaft of the engine, a commutator mounted to operate in synchronism with said cam, a housing for said cam, and means for controlling the actuation of said rocker arms by the rotation of said cam, said means including a lever fulcrumed on said bracket, a reciprocating member having bearings within said housing and forming a carriage for a pair of cam followers, means carried by said lever for engaging each of said rocker arms, and means of connection between said lever and said carriage, whereby the oscillation of said lever as the cam followers engage the active and inactive surfaces of said cam will permit said valves to function in synchronism with the piston strokes.

9. A valve gear for multi-cylinder internal combustion engines comprising inlet and exhaust valves for each cylinder, yieldable means for seating said valves, a cam having its operating face disposed substantially in a plane perpendicular to the axis of rotation of the engine crank shaft, and positively actuated means for opening the inlet and exhaust valves of a plurality of said cylinders, the actuation of all of said means being controlled by said cam.

10. An overhead valve actuating mechanism for multi-cylinder internal combustion engines including a cam having its operating face disposed substantially in a plane perpendicular to the axis of rotation of the engine crank shaft, and mounted to rotate on an axis parallel to the engine head, a housing therefor, a member mounted to reciprocate within said housing, cam followers carried by said member, and means controlled by the reciprocation of said member as the cam followers are traversed by the active surface of the cam to positively control the opening of the inlet and exhaust valves of a predetermined one of said cylinders.

11. A multi-cylinder four-cycle internal combustion engine having inlet and exhaust valves in each cylinder, mechanism for actuating the inlet and exhaust valves of a plurality of said cylinders including a timing device having its operating face substantially in a plane perpendicular to the axis of rotation of the engine crank shaft, and common to all of said valve actuating mechanisms and adapted to control the inlet and exhaust valves in the respective cylinders in synchronism with the cycles of the engine.

12. A multi-cylinder internal combustion engine having inlet and exhaust valves in each cylinder, an operating cam for said valves, a pair of rock levers for the valves of each cylinder, and the rock levers of each pair being operatively connected respectively to the inlet and exhaust valves of the respective cylinder, and operating connections from said cam to each pair of said rock levers, and including a reciprocating lug cooperating to alternately rock the levers of a pair to alternately open the respective inlet and exhaust valves.

CHARLES W. FOERTSCH.